(12) United States Patent
Oinuma et al.

(10) Patent No.: US 11,340,423 B2
(45) Date of Patent: May 24, 2022

(54) CAMERA OPTICAL LENS

(71) Applicant: AAC Optics Solutions Pte. Ltd., Singapore (SG)

(72) Inventors: Kenji Oinuma, Shenzhen (CN); Lei Zhang, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 239 days.

(21) Appl. No.: 16/681,797

(22) Filed: Nov. 12, 2019

(65) Prior Publication Data

US 2021/0041662 A1     Feb. 11, 2021

(30) Foreign Application Priority Data

Aug. 6, 2019 (CN) .......................... 201910719423.1

(51) Int. Cl.
*G02B 9/62* (2006.01)
*G02B 13/00* (2006.01)
*G02B 27/00* (2006.01)

(52) U.S. Cl.
CPC ........... *G02B 9/62* (2013.01); *G02B 13/0045* (2013.01); *G02B 27/0012* (2013.01)

(58) Field of Classification Search
CPC ...... G02B 13/0045; G02B 13/18; G02B 9/62; G02B 9/64; G02B 3/04; G02B 27/0012
USPC .................................. 359/713, 756, 757, 759
See application file for complete search history.

(56) References Cited

U.S. PATENT DOCUMENTS

| | | | |
|---|---|---|---|
| 2013/0329306 A1 | 12/2013 | Tsai | |
| 2014/0111872 A1* | 4/2014 | Tang | G02B 13/0045 359/713 |
| 2014/0240825 A1 | 8/2014 | Okumura | |
| 2015/0138425 A1 | 5/2015 | Lee et al. | |
| 2019/0113714 A1 | 4/2019 | Hsueh et al. | |
| 2019/0121064 A1* | 4/2019 | Zhang | G02B 9/62 |
| 2019/0121099 A1 | 4/2019 | Li et al. | |

(Continued)

FOREIGN PATENT DOCUMENTS

| | | |
|---|---|---|
| CN | 105607229 A | 5/2016 |
| CN | 107783261 A | 3/2018 |

(Continued)

OTHER PUBLICATIONS

Graph of aspheric lens data from prior art using https://www.desmos.com/calculator (Year: 2021).*

*Primary Examiner* — Travis S Fissel
(74) *Attorney, Agent, or Firm* — W&G Law Group

(57) ABSTRACT

The present invention discloses a camera optical lens. The camera optical lens includes, in an order from an object side to an image side, a first lens with a positive refractive power, a second lens with a negative refractive power, a third lens with a positive refractive power, a fourth lens with a negative refractive power, a fifth lens with a positive refractive power, and a sixth lens with a negative refractive power. The camera optical lens further satisfies the following specific conditions: $3.00 \leq d1/d3 \leq 4.00$, $1.50 \leq R1/d1 \leq 5.00$, $-30.00 \leq R9/R10 \leq -8.00$, and $-10.00 \leq R12/R11 \leq -0.50$. The camera optical lens can achieve a high performance while obtaining a low TTL.

9 Claims, 7 Drawing Sheets

(56) References Cited

U.S. PATENT DOCUMENTS

| | | | |
|---|---|---|---|
| 2019/0170982 A1 | 6/2019 | Sekine et al. | |
| 2019/0187437 A1 | 6/2019 | Hsueh et al. | |

FOREIGN PATENT DOCUMENTS

| | | |
|---|---|---|
| CN | 207601410 U | 7/2018 |
| CN | 208297807 U | 12/2018 |
| CN | 109283664 A | 1/2019 |
| CN | 109307922 A | 2/2019 |
| CN | 109343204 A | 2/2019 |
| CN | 109491048 A | 3/2019 |
| CN | 209044159 U | 6/2019 |
| JP | 2016114633 A | 6/2016 |
| JP | 2017049329 A | 3/2017 |
| JP | 2019152774 A | 9/2019 |
| WO | 2014175058 A1 | 10/2014 |

\* cited by examiner

CAMERA OPTICAL LENS

FIELD OF THE PRESENT DISCLOSURE

The present disclosure relates to the field of optical lens, more particularly, to a camera optical lens suitable for handheld terminal devices such as smart phones, digital cameras and imaging device, such as monitor, or PC lens.

DESCRIPTION OF RELATED ART

With the emergence of smart phones in recent years, the demands for miniature camera lens is increasing day by day, but in general the photosensitive device of general camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market. In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece, six-piece and seven-piece lens structures gradually appear in lens designs. There is an urgent ultra-thin, wide-angle camera lenses with good optical characteristics and fully corrected chromatic aberration.

DETAILED DESCRIPTION OF THE EXEMPLARY EMBODIMENTS

In order to make the objects, technical solutions, and advantages of the present invention more apparent, the embodiments of the present invention will be described in detail below, combined with the drawings. However, it will be apparent to the one skilled in the art that, in the various embodiments of the present invention, a number of technical details are presented in order to provide the reader with a better understanding of the invention. However, the technical solutions claimed in the present invention can be implemented without these technical details and can be implemented based on various changes and modifications to the following embodiments.

(Embodiment 1)

Figure 1:
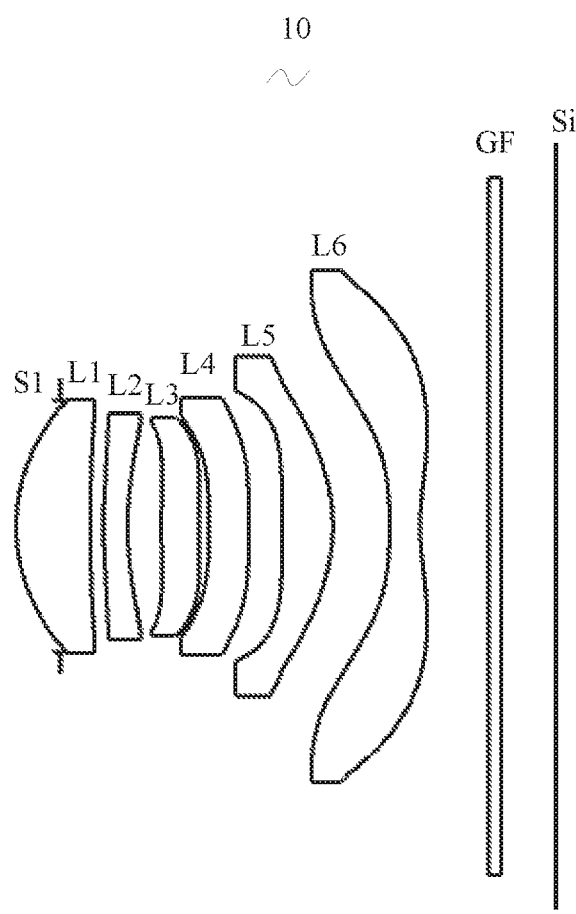
FIG. 1 is a schematic diagram of a structure of a camera optical lens in accordance with Embodiment 1 of the present disclosure.

As referring to a figure, the present invention provides a camera optical lens 10. FIG. 1 shows the camera optical lens 10 according to embodiment 1 of the present invention, the camera optical lens 10 comprises six lenses. Specifically, from an object side to an image side, the camera optical lens 10 comprises in sequence: an aperture S1, a first lens L1, a second lens L2, a third lens L3, a fourth lens L4, a fifth lens L5, and a sixth lens L6. Optical elements like optical filter GF can be arranged between the sixth lens L6 and an image surface Si.

The first lens L1, the second lens L2, the third lens L3, the fourth lens L4, the fifth lens L5, and the sixth lens L6 all are made of plastic material.

The first lens L1 has a positive refractive power, the second lens L2 has a negative refractive power, the third lens L3 has a positive refractive power, the fourth lens L4 has a negative refractive power, the five lens L5 has a positive refractive power, and the sixth lens L6 has a negative refractive power.

Here, an on-axis thickness of the first lens L1 is defined as d1; an on-axis thickness of the second lens L2 is defined as d3; a curvature radius of an object side surface of the first lens L1 is defined as R1; an on-axis curvature radius of an object side surface of the fifth lens L5 is defined as R9; an on-axis curvature radius of an image side surface of the fifth lens L5 is defined as R10; an on-axis curvature radius of an object side surface of the sixth lens L6 is defined as R11; and an on-axis curvature radius of an image side surface of the sixth lens L6 is defined as R12. The camera optical lens 10 satisfies the following conditions (1)-(4):

$$3.00 \leq d1/d3 \leq 4.00 \qquad (1);$$

$$1.50 \leq R1/d1 \leq 5.00 \qquad (2);$$

$$-30.00 \leq R9/R10 \leq -8.00 \qquad (3);$$

$$-10.00 \leq R12/R11 \leq -0.50 \qquad (4).$$

The condition (1) defines a ratio of the on-axis thickness d1 of the first lens L1 to the on-axis thickness d3 of the second lens L2. If the condition (1) is not satisfied, it would be difficult to achieve miniaturization under the state of FNO lighting.

The condition (2) specifies a ratio of the on-axis curvature radius R1 of the object side surface of the first lens L1 and the on-axis thickness d1 of the first lens L1. If the condition (2) is not satisfied, it would be difficult to achieve miniaturization under the state of FNO lighting.

The condition (3) specifies a ratio of the curvature radius R9 of the object side surface to the curvature radius R10 of the image side surface of the fifth lens L5. The fifth lens L5 can effectively correct an aberration of the system by reasonably controlling this ratio. If the condition (3) is not satisfied, it would be difficult to achieve an excellent imaging performance under the state of FNO lighting.

The condition (4) specifies a ratio of the curvature radius R12 of the image side surface to the curvature radius R11 of the object side surface of the sixth lens L6. The sixth lens L6 can effectively correct the aberration of the system by reasonably controlling this ratio. If the condition (4) is not satisfied, it would be difficult to achieve the excellent imaging performance under the state of FNO lighting.

When the on-axis thickness of the first lens, the on-axis thickness of the second lens, the curvature radius of the object side surface of the first lens, the on-axis curvature radius of the object side surface of the fifth lens, the on-axis curvature radius of the image side surface of the fifth lens, the on-axis curvature radius of the object side surface of the sixth lens, and the on-axis curvature radius of the image side surface of the sixth lens of the camera optical lens 10 of the present invention satisfy the above conditions, the camera optical lens 10 has the advantages of high performance and satisfies the design requirement on wide-angle and low TTL.

In the embodiment, the object side surface of the first lens L1 is convex in a paraxial region, and an image side surface of the first lens L1 is concave in the paraxial region, and the first lens L1 has a positive refractive power. An object side surface of the second lens L2 is convex in the paraxial region, and an image side surface of the second lens L2 is concave in the paraxial region, and the second lens L2 has a negative refractive power. An object side surface of the third lens L3 is convex in the paraxial region, and an image side surface of the third lens L3 is concave in the paraxial region, and the third lens L3 has a positive refractive power. An object side surface of the fourth lens L4 is concave in the paraxial region, and an image side surface of the fourth lens L4 is concave in the paraxial region, and the fourth lens L4 has a negative refractive power. The object side surface of the fifth lens L5 is convex in the paraxial region, and the image side surface of the fifth lens L5 is convex in the paraxial region, and the fifth lens L5 has a positive refractive power. The object side surface of the sixth lens L6 is concave in the paraxial region, and the image side surface of the sixth lens L6 is concave in the paraxial region, and the sixth lens L6 has a negative refractive power.

An on-axis curvature radius of the object side surface of the third lens L3 is R5, an on-axis curvature radius of the image side surface of the third lens L3 is R6, and the camera optical lens 10 satisfies the following condition (5):

$$-20.00 \leq (R5+R6)/(R5-R6) \leq -2.00 \qquad (5).$$

The condition expression (5) specifies a shape of the third lens, when the value is within the range, it is beneficial for achieving miniaturization under the state of FNO lighting.

In addition, more preferably, the value range of the condition (5) is set as the value range of the following condition (5-A).

$$-13.00 \leq (R5+R6)/(R5-R6) \leq -2.00 \qquad (5\text{-}A).$$

A focal length of the fifth lens L5 is defined as f5, a focal length of the sixth lens L6 is defined as f6, and the camera optical lens 10 satisfies the following condition (6):

$$-2.00 \leq f5/f6 \leq -0.80 \qquad (6).$$

The condition (5) specifies a ratio of the focal length of the fifth lens to the focal length of the sixth lens. The refractive power is reasonably distributed so that the system has a good imaging quality and lower sensitivity.

In addition, more preferably, the value range of the condition expression (6) is set as the value range of the following condition (6-A).

$$-1.50 \leq f5/f6 \leq -1.00 \qquad (6\text{-}A).$$

An on-axis curvature radius of the object side surface of the second lens L2 is defined as R3, an on-axis thickness of the second lens L2 is defined as d3, and they satisfy the following condition (7):

$$20.00 \leq R3/d3 \leq 50.00 \qquad (7).$$

The condition (7) specifies a ratio of the on-axis curvature radius of the object side surface of the second lens to the on-axis thickness of the second lens. The shape of the second lens is reasonably designed so that the system has the good imaging quality and lower sensitivity.

The on-axis curvature radius of the object side surface of the second lens L2 is defined as R3, an on-axis curvature radius of image side surface of the second lens L2 is defined as R4, and the camera optical lens 10 satisfies the following condition (8):

$$1.00 \leq R3/R4 \leq 5.00 \qquad (8).$$

The condition (8) specifies a ratio of the on-axis curvature radius of the object side surface of the second lens to the on-axis curvature radius of the image side surface of the second lens. The shape of the second lens is reasonably designed so that the system has the good imaging quality and lower sensitivity.

An on-axis thickness of the sixth lens L6 is defined as d11, a total optical length from the object side surface of the first lens L1 of the camera optical lens 10 to the image surface of the camera optical lens 10 along an optical axis is defined as TTL, and the camera optical lens 10 satisfies the following condition (9):

$$0.04 \leq d11/TTL \leq 0.20 \qquad (9).$$

The condition (9) specifies a ratio of the on-axis thickness of the sixth lens to the total optical length TTL, and when the value is within the range of the condition (9), it is beneficial for achieving miniaturization under the state of FNO lighting.

In addition, more preferably, the value range of the condition (9) is set as the value range of the following condition (9-A);

$$0.04 \leq d11/TTL \leq 0.13 \qquad (9\text{-}A).$$

A vertical distance between an critical point of the image side surface of the sixth lens to the optical axis is defined as Yc62, and the camera optical lens 10 satisfies the following condition (10):

$$0.10 \leq Yc62/TTL \leq 0.30 \qquad (10).$$

The condition (10) specifies a ratio of the position of the critical point of the sixth lens to the total optical length. When the value is within the range, it is beneficial for correcting an aberration and a distortion of the camera optical lens 10.

In addition, more preferably, the value range of the condition expression (10) is further set as the value range of the following condition (10-A);

$$0.15 \leq Yc62/TTL \leq 0.25 \qquad (10\text{-}A).$$

In addition, more preferably, the value range of the condition expression (4) is further set as the value range of the following condition (4-A);

$$-1.00 \leq R12/R11 \leq -0.50 \qquad (4\text{-}A).$$

A FNO of the camera optical lens 10 is less than or equal to 2.05. The FNO is an F number of the camera optical lens. When the condition is satisfied, the camera optical lens 10 has a good brightness to meet requirement on large aperture while having a better effect on nighttime shooting.

With such design, the total optical length TTL of the camera optical lens 10 can be made as short as possible, thus the miniaturization characteristics can be maintained and satisfy demands on large aperture.

In the following, examples will be used to describe the camera optical lens 10 of the present invention. The symbols recorded in each example will be described as follows. The unit of the focal length, on-axis distance, curvature radius, on-axis thickness, inflexion point position and critical point position is mm, and a unit of a whole picture angel is °.

f: focal length of the camera optical lens;
f1: focal length of the first lens L1;
f2: focal length of the second lens L2;
f3: focal length of the third lens L3;
f4: focal length of the fourth lens L4;
FNO: F number;
2ω: whole picture angel;
S1: aperture;
R: curvature radius of an optical surface, the central curvature radius in case of lens;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the sixth lens L6;
R12: curvature radius of the image side surface of the sixth lens L6;
R13: curvature radius of an object side surface of the optical filter GF;
R14: curvature radius of an image side surface of the optical filter GF;
d: on-axis thickness of the lens and the distance on-axis between the lenses;
d0: on-axis distance from aperture S1 to the object side surface of the first lens L1;
d1: on-axis thickness of the first lens L1;
d2: on-axis distance from the image side surface of the first lens L1 to the object side surface of the second lens L2;
d3: on-axis thickness on-axis of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the optical filter GF;
d13: on-axis thickness of the optical filter GF;
d14: on-axis distance from the image side surface Si to the image surface of the optical filter GF to the image surface;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
nd6: refractive index of the d line of the sixth lens L6;
ndg: refractive index of the d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF;
TTL: The total optical length from the object side surface of the first lens of the camera optical lens to the image surface Si of the camera optical lens along the optical axis, the unit of TTL is mm.
LB: on-axis distance from the image side of the sixth lens L6 to the axis of the image surface Si (including a thickness of the optical filter GF);
IH: Image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (8).$$

Where, K is a conic coefficient, A4, A6, A8, A10, A12, A14, A16, A18, and A20 are aspheric surface coefficients. x is a vertical distance of the point on the aspheric curve and the optical axis, and y is a depth of the aspheric surface (a vertical distance between the point on the aspheric surface from the optical axis x and the tangent on the apex on the aspherical optical axis).

For convenience, an aspheric surface of each lens surface uses the aspheric surfaces shown in the above formula (8). However, the present invention is not limited to the aspherical polynomials form shown in the formula (8).

Preferably, inflexion points and/or critical points can also be arranged on the object side surface and/or image side surface of the lens, so that the demand for high quality imaging can be satisfied, the description below can be referred for specific implementable scheme.

The design information of the camera optical lens 10 in the first embodiment of the present invention is shown in the tables 1 and 2.

TABLE 1

| | R | d | | nd | | vd |
|---|---|---|---|---|---|---|
| S1 | ∞ | d0 = | −0.400 | | | |
| R1 | 1.700 | d1 = | 0.671 | nd1 | 1.5439 | v1 | 55.95 |
| R2 | 8.514 | d2 = | 0.120 | | | |
| R3 | 4.521 | d3 = | 0.220 | nd2 | 1.6713 | v2 | 19.24 |
| R4 | 2.598 | d4 = | 0.307 | | | |
| R5 | 9.731 | d5 = | 0.346 | nd3 | 1.5439 | v3 | 55.95 |
| R6 | 11.548 | d6 = | 0.089 | | | |
| R7 | −17.367 | d7 = | 0.362 | nd4 | 1.6713 | v4 | 19.24 |
| R8 | 143.637 | d8 = | 0.301 | | | |
| R9 | 48.546 | d9 = | 0.461 | nd5 | 1.5439 | v5 | 55.95 |
| R10 | −1.646 | d10 = | 0.520 | | | |

TABLE 1-continued

|     | R      | d     |       | nd  |        | vd |       |
|-----|--------|-------|-------|-----|--------|----|-------|
| R11 | -4.160 | d11 = | 0.275 | nd6 | 1.5352 | v6 | 56.12 |
| R12 | 2.286  | d12 = | 0.625 |     |        |    |       |
| R13 | ∞      | d13 = | 0.110 | ndg | 1.5168 | vg | 64.17 |
| R14 | ∞      | d14 = | 0.500 |     |        |    |       |

Table 2 shows the aspherical surface data of the camera optical lens 10 in the Embodiment 1 of the present invention.

TABLE 2

|     | Conic coefficient | Aspherical surface coefficients | | | | |
|-----|-------------------|------------|------------|------------|------------|------------|
|     | k                 | A4         | A6         | A8         | A10        | A12        |
| R1  | 1.7680E-02        | 3.9943E-04 | -2.8716E-03 | 1.8204E-03 | 2.7361E-02 | -7.0247E-02 |
| R2  | 2.6669E+01        | -9.1962E-02 | 1.4314E-01 | -1.3002E-01 | 6.9923E-02 | -2.2740E-02 |
| R3  | 3.3987E+00        | -2.2183E-01 | 3.1275E-01 | -1.3069E-01 | -4.6951E-01 | 1.3179E+00 |
| R4  | -6.2283E+00       | -1.4305E-01 | 2.3808E-01 | -1.7924E-01 | -2.2392E-02 | 1.2903E-01 |
| R5  | -4.2444E+02       | -3.7333E-02 | -3.9346E-01 | 1.8920E+00 | -6.3529E+00 | 1.3004E+01 |
| R6  | -7.5620E+00       | -2.4238E-01 | -4.3156E-02 | 4.7687E-01 | -1.4526E+00 | 2.1802E+00 |
| R7  | 0.0000E+00        | -3.6106E-01 | 1.7620E-01 | 7.7633E-02 | -2.2675E-01 | 2.2961E-01 |
| R8  | 0.0000E+00        | -2.6493E-01 | 8.3314E-02 | 1.5270E-01 | -2.3999E-01 | 1.6722E-01 |
| R9  | 0.0000E+00        | -7.8751E-02 | -1.1628E-01 | 4.7821E-02 | 8.3786E-02 | -1.3077E-01 |
| R10 | -2.6511E+00       | 4.9284E-02 | -1.1400E-01 | 6.6673E-02 | -1.6760E-02 | 9.8095E-03 |
| R11 | -2.9825E+00       | -1.7332E-01 | 7.6705E-02 | -9.2211E-03 | -9.1654E-04 | 2.0875E-04 |
| R12 | -1.6353E+01       | -1.3055E-01 | 6.5641E-02 | -2.5369E-02 | 6.5262E-03 | -1.0954E-03 |

|     | Conic coefficient | Aspherical surface coefficients | | | |
|-----|-------------------|------------|------------|------------|------------|
|     | k                 | A14        | A16        | A18        | A20        |
| R1  | 1.7680E-02        | 6.8277E-02 | -2.2563E-02 | -3.0023E-03 | 2.1553E-03 |
| R2  | 2.6669E+01        | 8.0862E-03 | -2.8591E-03 | -6.1238E-04 | -5.6559E-04 |
| R3  | 3.3987E+00        | -1.7957E+00 | 1.4122E+00 | -5.9958E-01 | 1.0332E-01 |
| R4  | -6.2283E+00       | -2.2331E-02 | -5.1564E-02 | -4.5910E-02 | 6.1120E-02 |
| R5  | -4.2444E+02       | -1.6735E+01 | 1.3265E+01 | -5.9812E+00 | 1.1865E+00 |
| R6  | -7.5620E+00       | -2.0264E+00 | 1.2188E+00 | -4.2288E-01 | 5.6969E-02 |
| R7  | 0.0000E+00        | -3.2611E-01 | 3.5689E-01 | -1.6531E-01 | 2.1017E-02 |
| R8  | 0.0000E+00        | -7.0208E-02 | 1.7245E-02 | -6.3980E-03 | 3.5426E-03 |
| R9  | 0.0000E+00        | 7.2749E-02 | -2.3729E-02 | 5.0949E-03 | -7.9882E-04 |
| R10 | -2.6511E+00       | -6.0952E-03 | 1.6588E-03 | -2.2206E-04 | 1.6618E-05 |
| R11 | -2.9825E+00       | 3.1996E-05 | -1.0785E-05 | 1.0239E-06 | -3.5870E-08 |
| R12 | -1.6353E+01       | 1.1130E-04 | -6.4079E-06 | 1.8103E-07 | 4.9033E-09 |

Table 3 and Table 4 show design data of inflexion points and critical points of respective lens in the camera optical lens 10 according to Embodiment 1 of the present invention. P1R1 and P1R2 represent the object side surface and the image side surface of the first lens L1, P2R1 and P2R2 represent the object side surface and the image side surface of the second lens L2, P3R1 and P3R2 represent the object side surface and the image side surface of the third lens L3, P4R1 and P4R2 represent the object side surface and the image side surface of the fourth lens L4, P5R1 and P5R2 represent the object side surface and the image side surface of the fifth lens L5, and P6R1 and P6R2 represent the object side surface and the image side surface of the sixth lens L6. The data in the column named "inflexion point position" refers to vertical distances from inflexion points arranged on each lens surface to the optical axis of the camera optical lens 10. The data in the column named "critical point position" refers to vertical distances from critical points arranged on each lens surface to the optical axis of the camera optical lens 10.

TABLE 3

|      | Number of inflexion points | Inflexion point position 1 | Inflexion point position 2 | Inflexion point position 3 | Inflexion point position 4 |
|------|------|-------|-------|-------|-------|
| P1R1 | 0    |       |       |       |       |
| P1R2 | 1    | 0.965 |       |       |       |
| P2R1 | 4    | 0.415 | 0.565 | 0.905 | 1.325 |
| P2R2 | 0    |       |       |       |       |
| P3R1 | 1    | 0.275 |       |       |       |

TABLE 3-continued

|      | Number of inflexion points | Inflexion point position 1 | Inflexion point position 2 | Inflexion point position 3 | Inflexion point position 4 |
|------|------|-------|-------|---|---|
| P3R2 | 1    | 0.175 |       |   |   |
| P4R1 | 0    |       |       |   |   |
| P4R2 | 2    | 0.055 | 1.105 |   |   |
| P5R1 | 1    | 0.145 |       |   |   |
| P5R2 | 2    | 1.125 | 1.455 |   |   |
| P6R1 | 1    | 1.255 |       |   |   |
| P6R2 | 2    | 0.435 | 2.215 |   |   |

TABLE 4

|      | Number of critical points | Critical point position 1 | Critical point position 2 |
|------|---|-------|-------|
| P1R1 | 0 |       |       |
| P1R2 | 0 |       |       |
| P2R1 | 2 | 1.035 | 1.385 |
| P2R2 | 0 |       |       |
| P3R1 | 1 | 0.465 |       |
| P3R2 | 1 | 0.295 |       |
| P4R1 | 0 |       |       |

TABLE 4-continued

| | Number of critical points | Critical point position 1 | Critical point position 2 |
|---|---|---|---|
| P4R2 | 1 | 0.085 | |
| P5R1 | 1 | 0.245 | |
| P5R2 | 0 | | |
| P6R1 | 1 | 2.165 | |
| P6R2 | 1 | 0.875 | |

Figure 2:
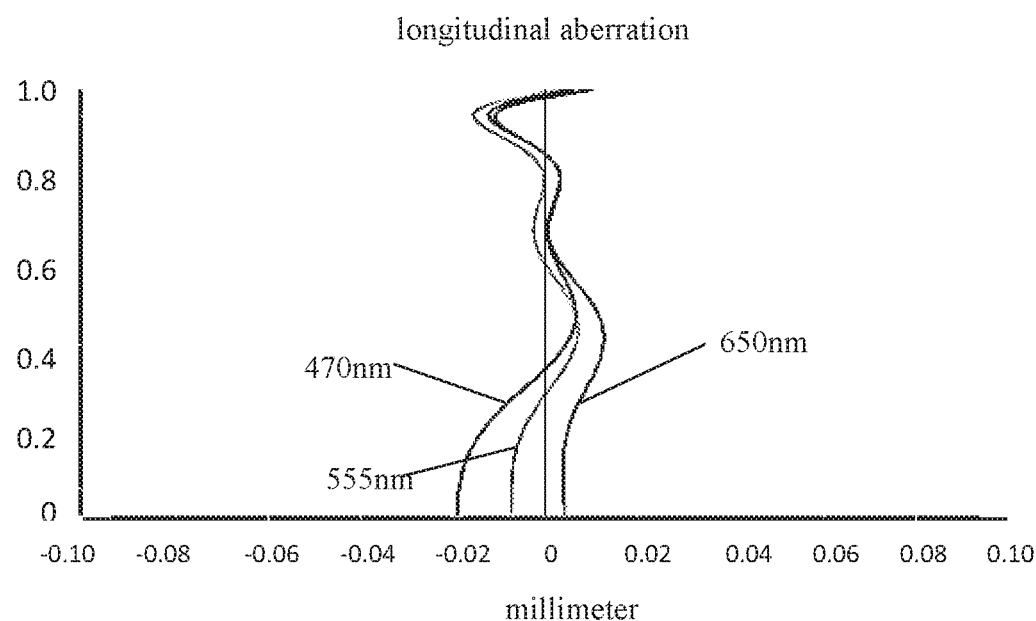
FIG. 2 is a schematic diagram of a longitudinal aberration of the camera optical lens shown in FIG. 1.
Figure 3:
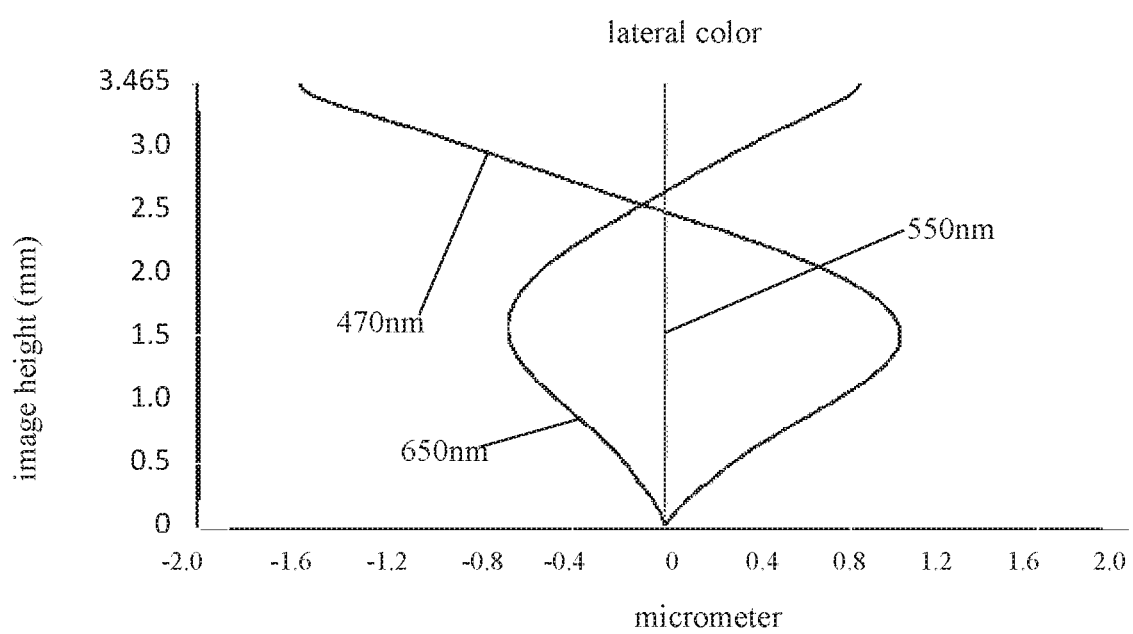
FIG. 3 is a schematic diagram of a lateral color of the camera optical lens shown in FIG. 1.
Figure 4:
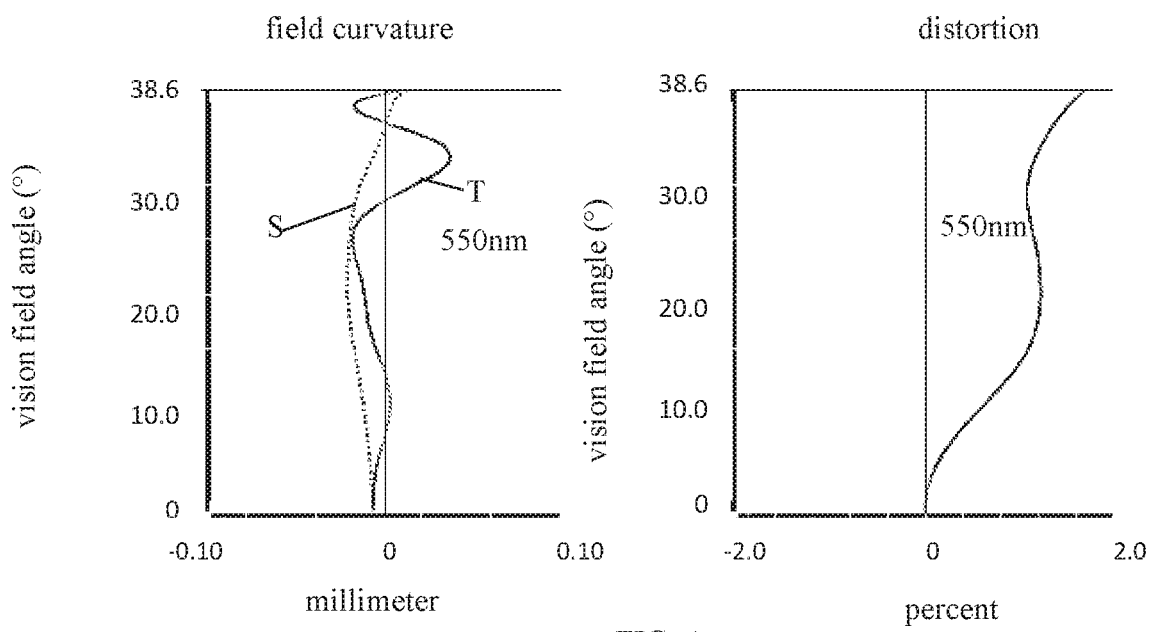
FIG. 4 is a schematic diagram of a field curvature and a distortion of the camera optical lens shown in FIG. 1.
Figure 5:
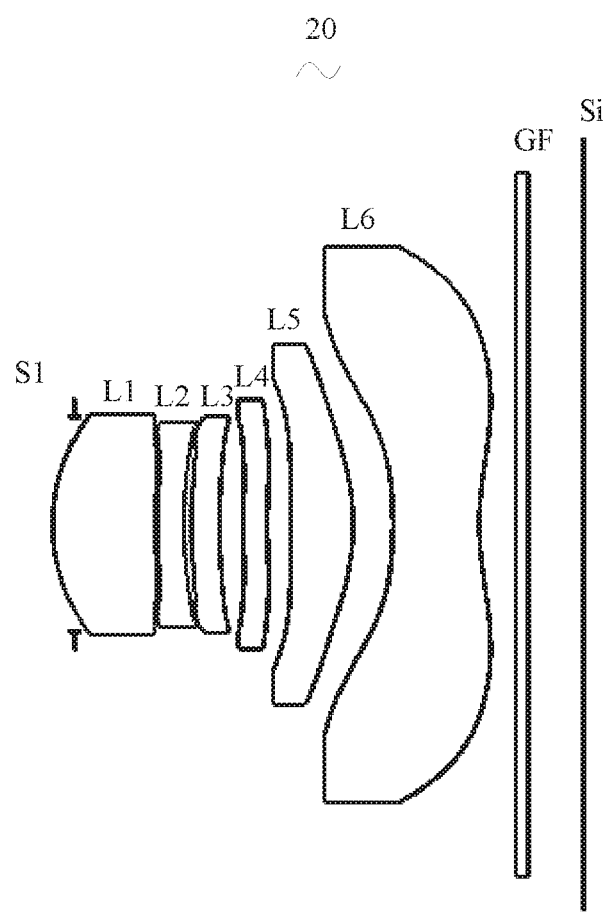
FIG. 5 is a schematic diagram of a structure of a camera optical lens in accordance with Embodiment 2 of the present disclosure.

FIG. 2 and FIG. 3 respectively illustrate a longitudinal aberration and a lateral color of light with wavelengths of 470 nm, 555 nm and 650 nm after passing the camera optical lens 10 according to Embodiment 1. FIG. 4 illustrates a field curvature and a distortion schematic diagrams of light with a wavelength of 555 nm after passing the camera optical lens 10 according to Embodiment 1, in which field curvature S is the field curvature in a sagittal direction, and T is the field curvature in a tangential direction.

Table 13 described below shows the various values of the Embodiments 1, 2, 3 and the values corresponding to the parameters which are specified in the conditions.

As shown in Table 13, Embodiment 1 satisfies the above conditions.

In this embodiment, an entrance pupil diameter ENPD of the camera optical lens is 2.250 mm. An image height of 1.0 H is 3.465 mm. A FOV 2ω is 77.26°. The total optical length TTL is 4.907 mm. Thus, the camera optical lens has a wide-angle and is ultra-thin. Its on-axis and off-axis chromatic aberrations are fully corrected, thereby achieving excellent optical characteristics.

(Embodiment 2)

Embodiment 2 is basically the same as Embodiment 1, the meaning of its symbols is the same as that of Embodiment 1, in the following, only the differences are listed.

Table 5 and table 6 show the design data of a camera optical lens 20 in Embodiment 2 of the present invention.

TABLE 5

| | R | d | | nd | | vd |
|---|---|---|---|---|---|---|
| S1 | ∞ | d0 = | −0.200 | | | |
| R1 | 1.590 | d1 = | 0.919 | nd1 | 1.5439 | v1 | 55.95 |
| R2 | 8.717 | d2 = | 0.025 | | | |
| R3 | 10.338 | d3 = | 0.230 | nd2 | 1.6713 | v2 | 19.24 |
| R4 | 3.355 | d4 = | 0.062 | | | |
| R5 | 3.903 | d5 = | 0.252 | nd3 | 1.5439 | v3 | 55.95 |
| R6 | 5.241 | d6 = | 0.213 | | | |
| R7 | 6.300 | d7 = | 0.213 | nd4 | 1.6713 | v4 | 19.24 |
| R8 | 4.219 | d8 = | 0.205 | | | |
| R9 | 51.363 | d9 = | 0.561 | nd5 | 1.5439 | v5 | 55.95 |
| R10 | −1.977 | d10 = | 0.353 | | | |
| R11 | −4.517 | d11 = | 0.770 | nd6 | 1.5352 | v6 | 56.12 |
| R12 | 2.321 | d12 = | 0.325 | | | |
| R13 | ∞ | d13 = | 0.110 | ndg | 1.5168 | vg | 64.17 |
| R14 | ∞ | d14 = | 0.500 | | | |

Table 6 shows the aspherical surface data of each lens of the camera optical lens 20 in Embodiment 2 of the present invention.

TABLE 6

| | Conic coefficient | Aspherical surface coefficients | | | | |
|---|---|---|---|---|---|---|
| | k | A4 | A6 | A8 | A10 | A12 |
| R1 | 6.7446E−02 | −2.5801E−02 | 1.1639E−01 | −3.4744E−01 | 5.3919E−01 | −5.7785E−01 |
| R2 | 0.0000E+00 | −1.3288E−02 | −2.4022E−01 | 2.4605E−01 | −4.4143E−01 | 1.8057E−01 |
| R3 | 0.0000E+00 | −4.1819E−02 | −1.9524E−02 | 4.0703E−02 | −8.4345E−01 | 8.6344E−01 |
| R4 | −1.2554E+00 | −1.0904E−01 | 1.9945E−01 | 1.2268E−01 | −1.1495E+00 | 1.2889E+00 |
| R5 | 0.0000E+00 | −1.4172E−01 | −2.1137E−01 | 1.9613E+00 | −6.4015E+00 | 1.2636E+01 |
| R6 | 0.0000E+00 | −7.7401E−02 | 8.4939E−02 | 6.9216E−03 | −1.5865E−02 | −5.2411E−02 |
| R7 | 0.0000E+00 | −2.7992E−01 | 2.1646E−01 | 6.6296E−02 | −2.3850E−01 | 2.4388E−01 |
| R8 | 1.6137E+00 | −2.7725E−01 | 1.0199E−01 | 1.6130E−01 | −2.3463E−01 | 1.6446E−01 |
| R9 | 0.0000E+00 | −1.4884E−02 | −7.9442E−02 | 4.5477E−02 | −8.0075E−03 | 1.8933E−03 |
| R10 | −2.1255E+00 | 3.9422E−02 | −4.3959E−03 | −5.8635E−04 | −5.7784E−05 | −7.0784E−05 |
| R11 | −7.8575E+00 | −1.7284E−01 | 7.7362E−02 | −9.2270E−03 | −9.5243E−04 | 1.8042E−04 |
| R12 | −5.9606E+00 | −1.2757E−01 | 6.5509E−02 | −2.5422E−02 | 6.5577E−03 | −1.0940E−03 |

| | Conic coefficient | Aspherical surface coefficients | | | |
|---|---|---|---|---|---|
| | k | A14 | A16 | A18 | A20 |
| R1 | 6.7446E−02 | 6.6328E−01 | −7.5645E−01 | 4.9471E−01 | −1.2153E−01 |
| R2 | 0.0000E+00 | 1.6627E−01 | 5.0055E−01 | −3.9018E−02 | −3.9441E−01 |
| R3 | 0.0000E+00 | 5.8064E−01 | −3.4056E−01 | −2.6464E−01 | 2.5636E−02 |
| R4 | −1.2554E+00 | −3.4802E−01 | 5.2893E−02 | 4.3920E−02 | 1.8242E−02 |
| R5 | 0.0000E+00 | −1.6845E+01 | 1.3612E+01 | −4.5146E+00 | −6.3528E−02 |
| R6 | 0.0000E+00 | −2.1570E−03 | 9.4068E−02 | 9.4418E−02 | −9.8209E−02 |
| R7 | 0.0000E+00 | −3.7196E−01 | 3.8315E−01 | −1.8486E−01 | 2.6470E−02 |
| R8 | 1.6137E+00 | −7.2274E−02 | 1.3353E−02 | −5.9597E−04 | 9.2044E−04 |
| R9 | 0.0000E+00 | −2.1607E−03 | 6.4115E−04 | 9.3078E−05 | −5.5480E−05 |
| R10 | −2.1255E+00 | 4.3132E−05 | −8.9719E−07 | −3.2969E−06 | −3.4815E−07 |
| R11 | −7.8575E+00 | 3.7556E−05 | −1.0555E−05 | 7.8146E−07 | −2.8123E−09 |
| R12 | −5.9606E+00 | 1.1115E−04 | −6.3417E−06 | 1.6023E−07 | 2.2473E−10 |

Table 7 and table 8 show design data of the inflexion points and the critical points of the camera optical lens 20 lens in Embodiment 2 of the present invention.

TABLE 7

|  | Number of inflexion points | Inflexion point position 1 | Inflexion point position 2 |
|---|---|---|---|
| P1R1 | 0 | | |
| P1R2 | 2 | 0.355 | 0.775 |
| P2R1 | 2 | 0.375 | 0.755 |
| P2R2 | 2 | 0.665 | 0.705 |
| P3R1 | 2 | 0.455 | 0.735 |
| P3R2 | 0 | | |
| P4R1 | 1 | 0.235 | |
| P4R2 | 2 | 0.285 | 1.135 |
| P5R1 | 1 | 0.255 | |
| P5R2 | 0 | | |
| P6R1 | 1 | 1.215 | |
| P6R2 | 1 | 0.535 | |

TABLE 8

|  | Number of critical points | Critical point position 1 | Critical point position 1 |
|---|---|---|---|
| P1R1 | 0 | | |
| P1R2 | 2 | 0.545 | 0.855 |
| P2R1 | 2 | 0.555 | 0.835 |
| P2R2 | 0 | | |
| P3R1 | 0 | | |
| P3R2 | 0 | | |
| P4R1 | 1 | 0.425 | |
| P4R2 | 1 | 0.525 | |
| P5R1 | 1 | 0.395 | |
| P5R2 | 0 | | |
| P6R1 | 0 | | |
| P6R2 | 1 | 1.115 | |

Figure 6:
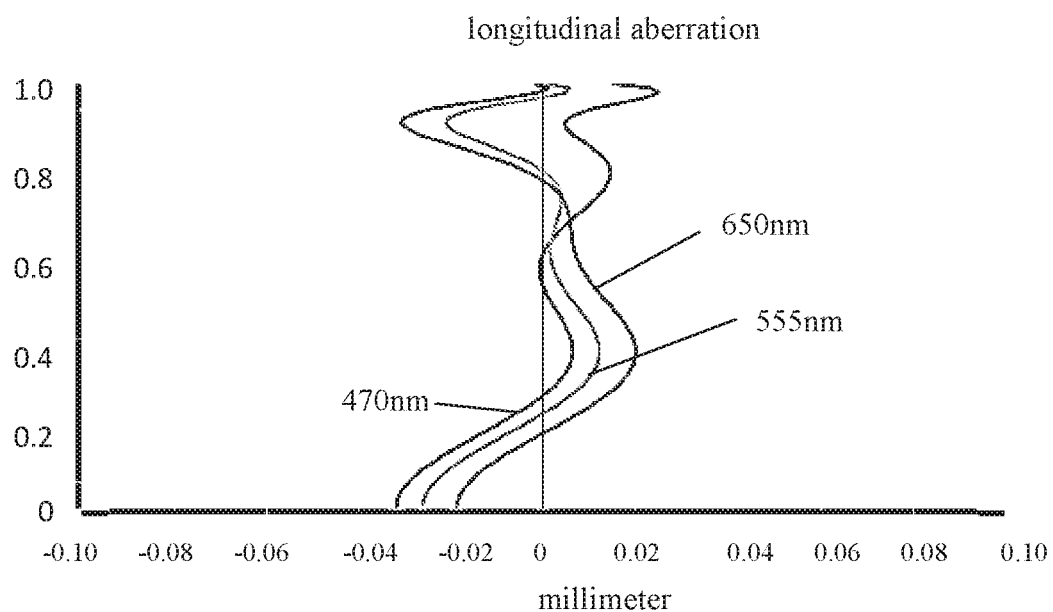
FIG. 6 is a schematic diagram of a longitudinal aberration of the camera optical lens shown in FIG. 5.
Figure 7:
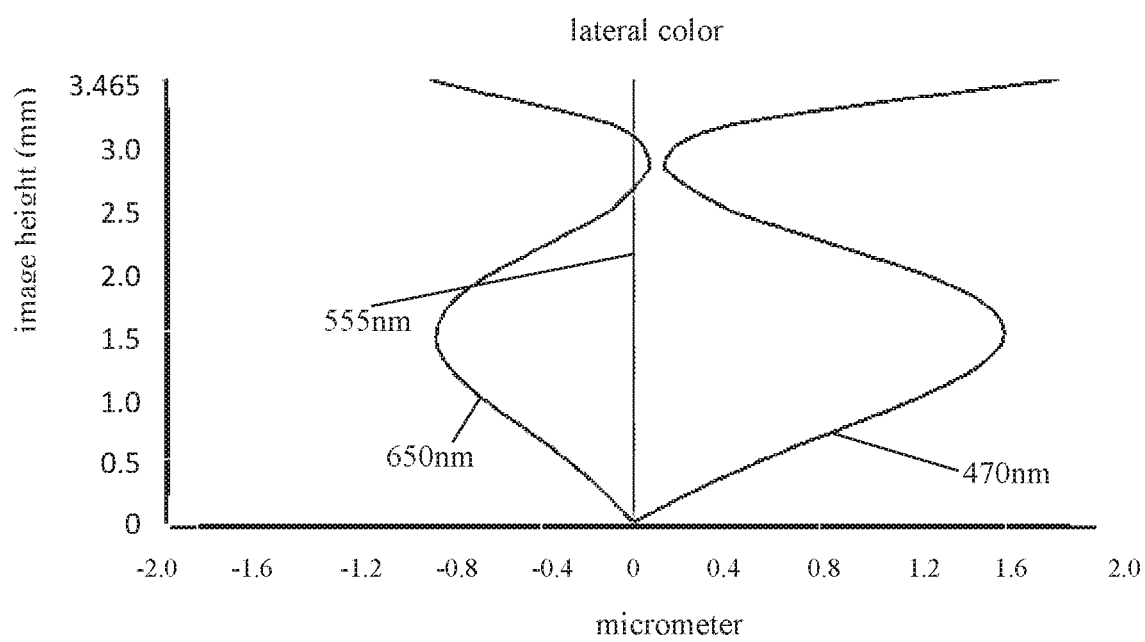
FIG. 7 is a schematic diagram of a lateral color of the camera optical lens shown in FIG. 5.
Figure 8:
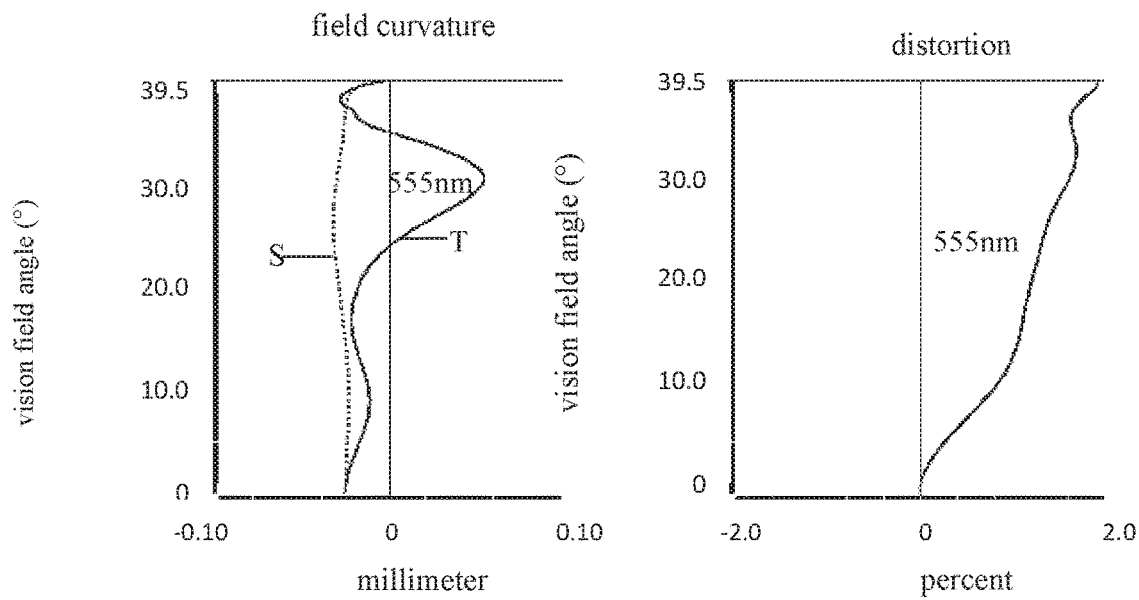
FIG. 8 is a schematic diagram of a field curvature and a distortion of the camera optical lens shown in FIG. 5.
Figure 9:
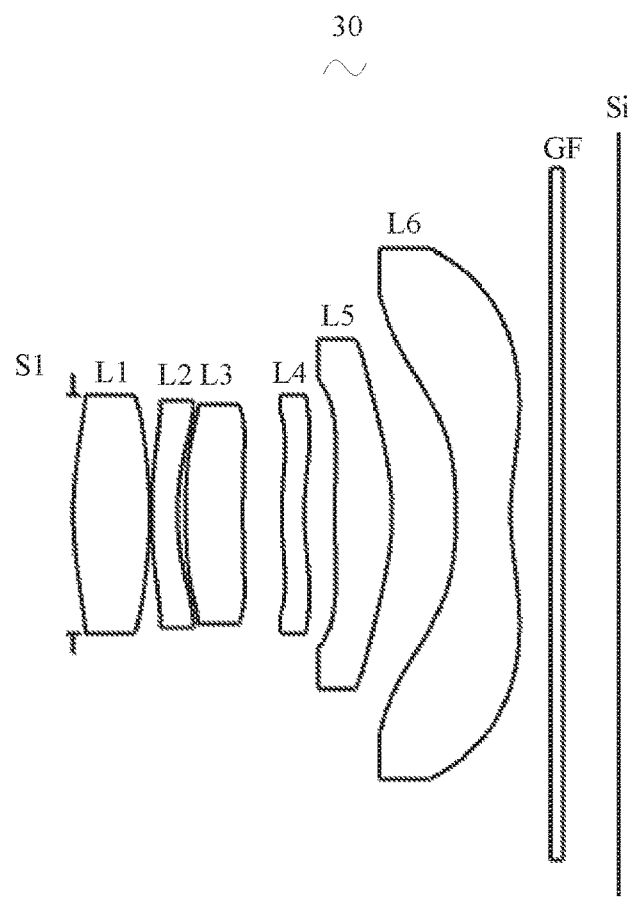
FIG. 9 is a schematic diagram of a structure of a camera optical lens in accordance with Embodiment 3 of the present disclosure.

FIG. 6 and FIG. 7 respectively illustrate a longitudinal aberration and a lateral color of light with wavelengths of 470 nm, 555 nm and 650 nm after passing the camera optical lens 20 according to Embodiment 2. FIG. 8 illustrates a field curvature and a distortion of light with a wavelength of 555 nm after passing the camera optical lens 10 according to Embodiment 2, in which a field curvature S is a field curvature in a sagittal direction and T is a field curvature in a tangential direction.

As shown in Table 13, Embodiment 2 satisfies the above conditions.

In this embodiment, the entrance pupil diameter ENPD of the camera optical lens is 2.016 mm. The image height IH of 1.0 H is 3.465 mm. The FOV 2ω is 78.99°. The total optical length TTL is 4.738 mm. Thus, the camera optical lens has a wide-angle and is ultra-thin. Its on-axis and off-axis chromatic aberrations are fully corrected, thereby achieving excellent optical characteristics.

(Embodiment 3)

Embodiment 3 is basically the same as Embodiment 1, the meaning of its symbols is the same as that of Embodiment 1, in the following, only the differences are listed.

The design information of a camera optical lens 30 in Embodiment 3 of the present invention is shown in the tables 9 and 10.

TABLE 9

|  | R | d | | nd | | vd | |
|---|---|---|---|---|---|---|---|
| S1 | ∞ | d0 = | 0.000 | | | | |
| R1 | 3.390 | d1 = | 0.691 | nd1 | 1.5439 | v1 | 55.95 |
| R2 | -3.590 | d2 = | 0.020 | | | | |
| R3 | 4.715 | d3 = | 0.230 | nd2 | 1.6713 | v2 | 19.24 |
| R4 | 2.299 | d4 = | 0.071 | | | | |
| R5 | 6.196 | d5 = | 0.520 | nd3 | 1.5439 | v3 | 55.95 |
| R6 | 13.037 | d6 = | 0.344 | | | | |
| R7 | 2.994 | d7 = | 0.202 | nd4 | 1.6713 | v4 | 19.24 |
| R8 | 2.367 | d8 = | 0.274 | | | | |
| R9 | 18.281 | d9 = | 0.518 | nd5 | 1.5439 | v5 | 55.95 |
| R10 | -2.284 | d10 = | 0.576 | | | | |
| R11 | -4.430 | d11 = | 0.489 | nd6 | 1.5352 | v6 | 56.12 |
| R12 | 2.339 | d12 = | 0.361 | | | | |
| R13 | ∞ | d13 = | 0.110 | ndg | 1.5168 | vg | 64.17 |
| R14 | ∞ | d14 = | 0.500 | | | | |

Table 10 shows the aspherical surface data of each lens of the camera optical lens 30 in Embodiment 3 of the present invention.

TABLE 10

| | Conic coefficient | Aspherical surface coefficients | | | | |
|---|---|---|---|---|---|---|
| | k | A4 | A6 | A8 | A10 | A12 |
| R1 | -3.0286E+00 | -3.3088E-02 | 4.2382E-02 | -2.3844E-01 | 5.0685E-01 | -5.5880E-01 |
| R2 | -1.5416E+01 | 6.0188E-02 | -1.3319E-01 | 2.3893E-01 | -3.5986E-01 | 2.5454E-01 |
| R3 | 0.0000E+00 | -3.5336E-02 | 8.5267E-02 | 1.3378E-01 | -7.9910E-01 | 8.2253E-01 |
| R4 | -2.8893E-01 | -1.7902E-01 | 3.1192E-01 | 3.2182E-01 | -1.4349E+00 | 9.6927E-01 |
| R5 | 0.0000E+00 | 2.6850E-02 | -6.3227E-02 | 1.7948E+00 | -6.3849E+00 | 1.2722E+01 |
| R6 | 0.0000E+00 | -4.0804E-02 | 6.4689E-02 | -8.0254E-02 | -3.1493E-01 | -2.1915E-03 |
| R7 | 0.0000E+00 | -3.0174E-01 | 1.3985E-01 | 7.3437E-02 | -2.2154E-01 | 2.4166E-01 |
| R8 | -7.9543E-01 | -2.9462E-01 | 8.3230E-02 | 1.4241E-01 | -2.3154E-01 | 1.7131E-01 |
| R9 | 0.0000E+00 | 7.5665E-04 | -9.1957E-02 | 3.7776E-02 | -1.0432E-02 | 1.0446E-03 |
| R10 | -5.0754E+00 | 3.4413E-02 | -6.1824E-03 | -1.0173E-03 | -8.0126E-05 | -4.6301E-05 |
| R11 | -2.7903E+00 | -1.7509E-01 | 7.7629E-03 | -9.1810E-03 | -9.4771E-04 | 1.8346E-04 |
| R12 | -1.0210E+01 | -1.2491E-01 | 6.4991E-02 | -2.5430E-02 | 6.5505E-03 | -1.0934E-03 |

| | Conic coefficient | Aspherical surface coefficients | | | |
|---|---|---|---|---|---|
| | k | A14 | A16 | A18 | A20 |
| R1 | -3.0286E+00 | 3.8611E-01 | -2.4055E-01 | 1.3728E-01 | -3.8127E-02 |
| R2 | -1.5416E+01 | 1.3281E-02 | -8.6377E-02 | -1.2562E-02 | 2.6849E-02 |
| R3 | 0.0000E+00 | 1.1805E-01 | -6.8124E-01 | 3.3816E-01 | -1.8331E-02 |

TABLE 10-continued

| | | | | | |
|---|---|---|---|---|---|
| R4 | −2.8893E−01 | −1.8052E−01 | 4.0760E−01 | −2.5577E−01 | −3.7976E−02 |
| R5 | 0.0000E+00 | −1.6957E+01 | 1.3253E+01 | −4.5511E+00 | 1.9246E−01 |
| R6 | 0.0000E+00 | 2.3604E−02 | 1.0823E−02 | −5.7550E−02 | 2.8656E−02 |
| R7 | 0.0000E+00 | −3.8735E−01 | 3.9962E−01 | −1.6619E−01 | −1.8705E−02 |
| R8 | −7.9543E−01 | −6.6795E−02 | 8.9158E−03 | −1.8173E−03 | 2.7897E−03 |
| R9 | 0.0000E+00 | −1.6697E−03 | 1.5740E−03 | 1.2100E−04 | −4.8784E−04 |
| R10 | −5.0754E+00 | 4.5838E−05 | 1.6282E−06 | −1.8614E−06 | −1.1563E−06 |
| R11 | −2.7903E+00 | 3.8136E−05 | −1.0593E−05 | 7.8223E−07 | −1.1149E−08 |
| R12 | −1.0210E+01 | 1.1123E−04 | −6.3351E−06 | 1.5963E−07 | 1.1911E−10 |

Table 11 and table 12 show design data of the inflexion points and the critical points of the camera optical lens 30 lens in Embodiment 3 of the present invention.

TABLE 11

| | Number of inflexion points | Inflexion point position 1 | Inflexion point position 2 | Inflexion point position 3 |
|---|---|---|---|---|
| P1R1 | 1 | 0.765 | | |
| P1R2 | 1 | 1.055 | | |
| P2R1 | 2 | 0.685 | 0.985 | |
| P2R2 | 3 | 0.685 | 0.905 | 0.965 |
| P3R1 | 1 | 0.765 | | |
| P3R2 | 1 | 0.495 | | |
| P4R1 | 1 | 0.335 | | |
| P4R2 | 2 | 0.375 | 1.055 | |
| P5R1 | 1 | 0.395 | | |
| P5R2 | 0 | | | |
| P6R1 | 1 | 1.245 | | |
| P6R2 | 1 | 0.485 | | |

TABLE 12

| | Number of critical points | Critical point position 1 |
|---|---|---|
| P1R1 | 0 | |
| P1R2 | 0 | |
| P2R1 | 0 | |
| P2R2 | 0 | |
| P3R1 | 1 | 0.975 |
| P3R2 | 1 | 0.695 |
| P4R1 | 1 | 0.615 |
| P4R2 | 1 | 0.725 |
| P5R1 | 1 | 0.595 |
| P5R2 | 0 | |
| P6R1 | 0 | |
| P6R2 | 1 | 1.005 |

Figure 10:
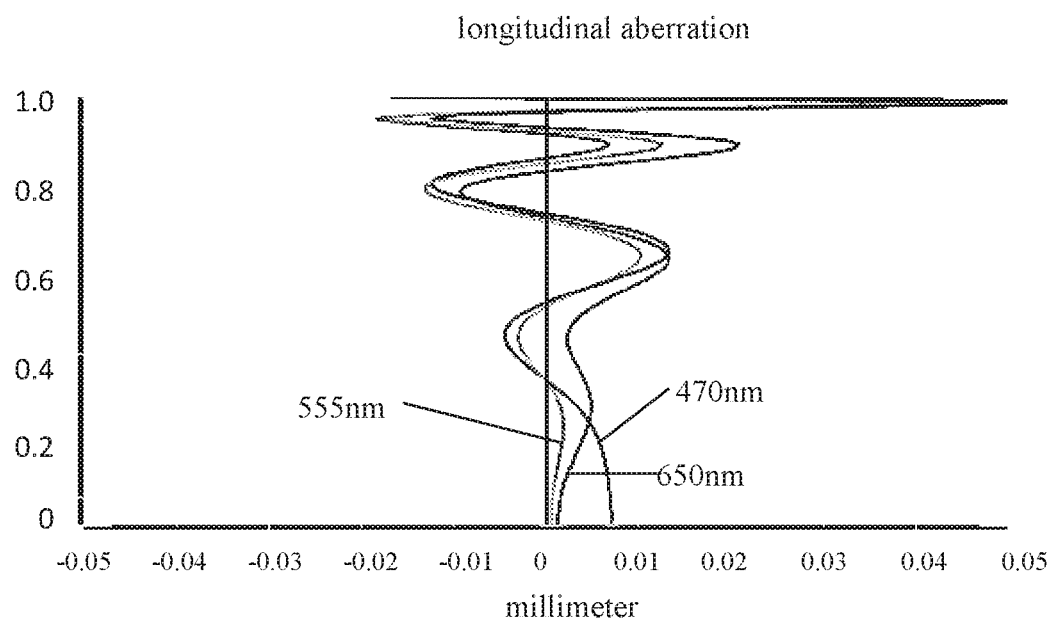
FIG. 10 is a schematic diagram of a longitudinal aberration of the camera optical lens shown in FIG. 9.
Figure 11:
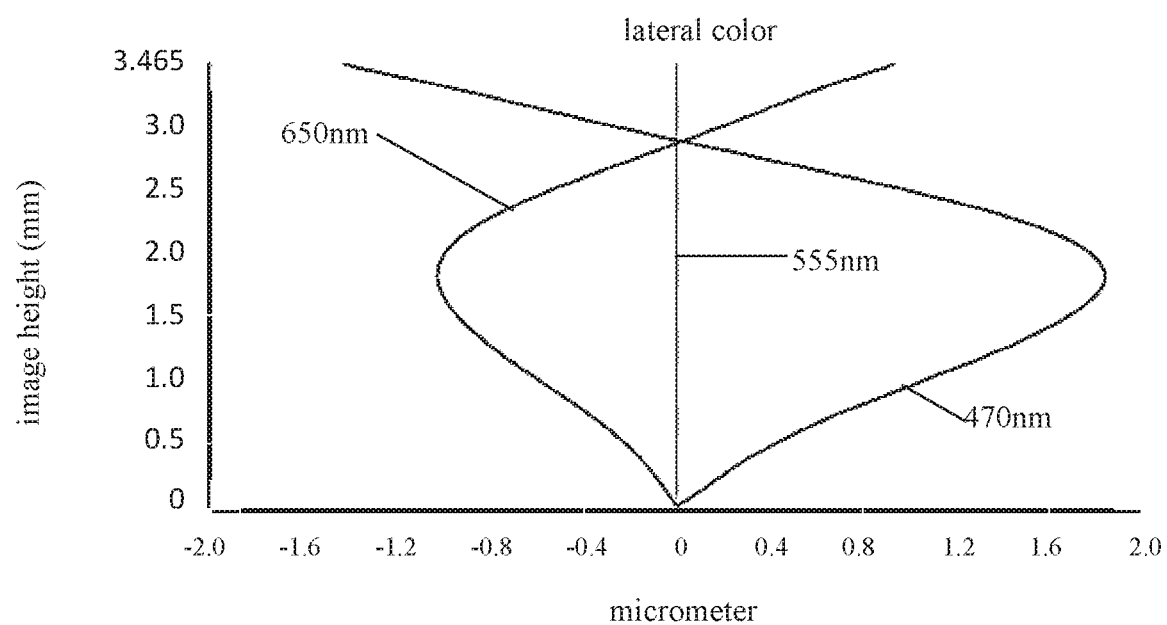
FIG. 11 is a schematic diagram of a lateral color of the camera optical lens shown in FIG. 9.
Figure 12:
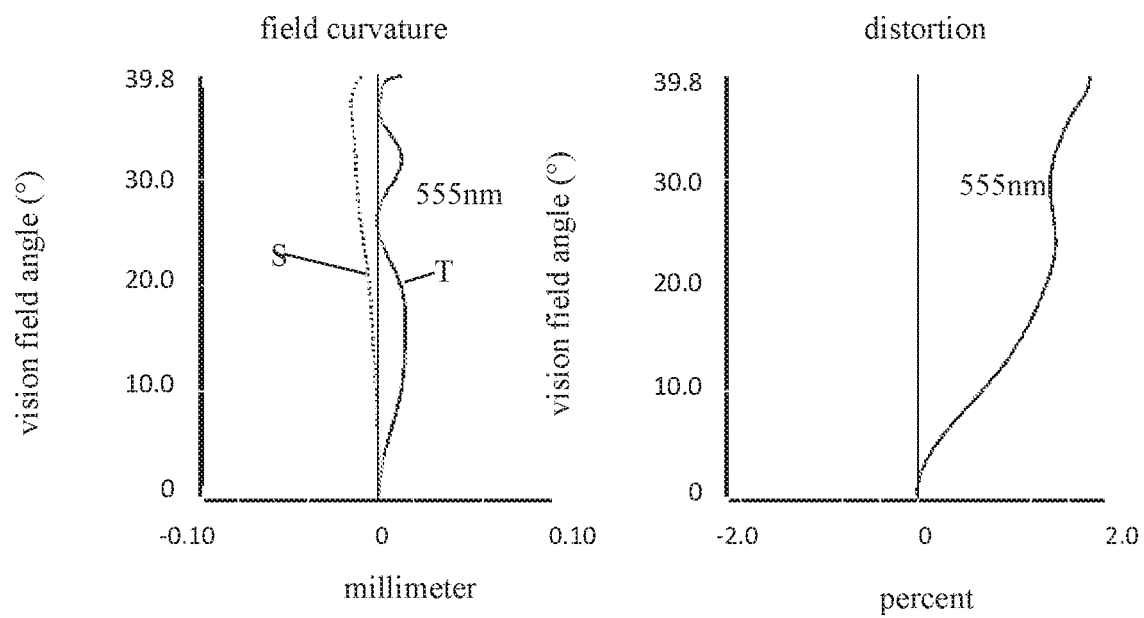
FIG. 12 is a schematic diagram of a field curvature and a distortion of the camera optical lens shown in FIG. 9.

FIG. 10 and FIG. 11 respectively illustrate a longitudinal aberration and a lateral color of light with wavelengths of 470 nm, 555 nm and 650 nm after passing the camera optical lens 30 according to Embodiment 3. FIG. 12 illustrates a field curvature and a distortion of light with a wavelength of 555 nm after passing the camera optical lens 30 according to Embodiment 3, in which a field curvature S is a field curvature in a sagittal direction and T is a field curvature in a tangential direction.

The following table 13, in accordance with the above conditions, lists the values in this embodiment corresponding to each condition. Apparently, the camera optical of this embodiment satisfies the above conditions.

In this embodiment, the entrance pupil diameter ENPD of the camera optical lens is 2.164 mm. The image height of 1.0 H is 3.465 mm. The FOV 2ω is 79.53°. The total optical length TTL is 4.906 mm. Thus, the camera optical lens has a wide-angle and is ultra-thin. Its on-axis and off-axis chromatic aberrations are fully corrected, thereby achieving excellent optical characteristics.

Table 13 shows the values of three embodiments and the values corresponding to the parameters specified in conditions (1)-(10). In addition, the units of each value shown in table 13 are: 2ω(°), f (mm), f1 (mm), f2 (mm), f3 (mm), f4 (mm), f5 (mm), f6 (mm), TTL (mm).

TABLE 13

| Parameters and conditions | Embodiment 1 | Embodiment 2 | Embodiment 3 | remarks |
|---|---|---|---|---|
| d1/d3 | 3.050 | 3.995 | 3.005 | condition (1) |
| R1/d1 | 2.534 | 1.731 | 4.905 | condition (2) |
| R9/R10 | −29.500 | −25.983 | −8.005 | condition (3) |
| R12/R11 | −0.550 | −0.514 | −0.528 | condition (4) |
| (R5 + R6)/(R5 − R6) | −11.711 | −6.838 | −2.812 | condition (5) |
| f5/f6 | −1.081 | −1.275 | −1.350 | condition (6) |
| R3/d3 | 20.550 | 44.948 | 20.499 | condition (7) |
| R3/R4 | 1.740 | 3.081 | 2.051 | condition (8) |
| d11/TTL | 0.056 | 0.163 | 0.100 | condition (9) |
| Yc62/TTL | 0.178 | 0.235 | 0.205 | condition (10) |
| FNO | 1.89 | 2.03 | 1.89 | |
| 2ω | 77.26 | 78.99 | 79.53 | |
| f | 4.253 | 4.082 | 4.089 | |
| f1 | 3.762 | 3.409 | 3.311 | |
| f2 | −9.452 | −7.431 | −6.888 | |
| f3 | 106.195 | 26.280 | 21.075 | |
| f4 | −22.847 | −19.673 | −19.185 | |
| f5 | 2.927 | 3.501 | 3.753 | |
| f6 | −2.707 | −2.747 | −2.780 | |
| TTL | 4.907 | 4.738 | 4.906 | |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens comprising, from an object side to an image side in sequence: a first lens with a positive refractive power, a second lens with a negative refractive power, a third lens with a positive refractive power, a fourth lens with a negative refractive power, a fifth lens with a positive refractive power, and a sixth lens with a negative refractive power;

the camera optical lens satisfies the following conditions (1)-(5):

$$3.00 \leq d1/d3 \leq 4.00 \quad (1);$$

$$1.50 \leq R1/d1 \leq 5.00 \quad (2);$$

$$-30.00 \leq R9/R10 \leq -8.00 \quad (3); \text{ and}$$

$$-10.00 \leq R12/R11 \leq -0.50 \quad (4);$$

$$-20.00 \leq (R5+R6)/(R5-R6) \leq -6.838 \quad (5);$$

where,
d1: an on-axis thickness of the first lens;
d3: an on-axis thickness of the second lens;
R1: an on-axis curvature radius of an object side surface of the first lens;
R9: an on-axis curvature radius of an object side surface of the fifth lens;
R10: an on-axis curvature radius of an image side surface of the fifth lens;
R11: an on-axis curvature radius of an object side surface of the sixth lens; and
R12: an on-axis curvature radius of an image side surface of the sixth lens,
R5: an on-axis curvature radius of an object side surface of the third lens;
R6: an on-axis curvature radius of an image side surface of the third lens.

2. The camera optical lens according to claim 1 further satisfying the following condition (5-A):

$$-13.00 \leq (R5+R6)/(R5-R6) \leq 6.838 \quad (5\text{-A}).$$

3. The camera optical lens according to claim 1 further satisfying the following condition (6):

$$-2.00 \leq f5/f6 \leq -0.80 \quad (6);$$

where,
f5: a focal length of the fifth lens; and
f6: a focal length of the sixth lens.

4. The camera optical lens according to claim 1 further satisfying the following condition (7):

$$20.00 \leq R3/d3 \leq 50.00 \quad (7);$$

where,
R3: an on-axis curvature radius of an object side surface of the second lens.

5. The camera optical lens according to claim 1 further satisfying the following condition (8):

$$1.00 \leq R3/R4 \leq 5.00 \quad (8);$$

where,
R3: a curvature radius of an object side surface of the second lens; and
R4: a curvature radius of an image side surface of the second lens.

6. The camera optical lens according to claim 1 further satisfying the following condition (9);

$$0.04 \leq d11/TTL \leq 0.20 \quad (9);$$

where,
d11: an on-axis thickness of the sixth lens; and
TTL: a total optical length from an object side surface of the first lens of the camera optical lens to an image surface of the camera optical lens along an optical axis.

7. The camera optical lens according to claim 1 further satisfying the following condition (10):

$$0.10 \leq Yc62/TTL \leq 0.30 \quad (10);$$

where,
Yc62: a vertical distance between an critical point of the image side surface of the sixth lens and an optical axis; and
TTL: a total optical length from an object side surface of the first lens of the camera optical lens to an image surface of the camera optical lens along the optical axis.

8. The camera optical lens according to claim 1 further satisfying the following condition (4-A):

$$-1.00 \leq R12/R11 \leq -0.50 \quad (4\text{-A}).$$

9. The camera optical lens according to claim 1, wherein, an FNO number of the camera optical lens is less than or equal to 2.05.

* * * * *